April 21, 1964  C. C. MINTER  3,130,365
ELECTRICAL RATIOMETER
Filed Nov. 24, 1961

INVENTOR
Clarke C. Minter 3,130,365
ELECTRICAL RATIOMETER
Clarke C. Minter, 1517 30th St. NW.,
Washington 7, D.C.
Filed Nov. 24, 1961, Ser. No. 154,739
3 Claims. (Cl. 324—140)

This invention relates to electrical measuring instruments and describes a novel ratiometer so constructed that both moving coils swing in a single semicircular gap between the pole pieces of a magnet.

Electrical ratiometers are well known and have been used extensively in the past. In the most common moving coil design the two coils attached to the same pivot post swing through two separate magnetic gaps in which the flux densities are made to increase uniformly from bottom to top by positioning the core so that its center is slightly above the exact geometrical center of the pole faces. As the movement rotates, one coil moves into a magnetic field of increasing strength (because the gap is decreasing in length), while the other coil moves into a field of decreasing strength (because the gap is increasing in length). The torques in the two coils oppose one another and at equilibrium are equal and opposite. At equilibrium we have Torque in coil #1=$NI_1B_1$ (deflecting coil)
Torque in coil #2=$NI_2B_2$ (control coil)

$$I_1B_1=I_2B_2$$

$N$=number of turns
$I$=current through coil
$B$=flux density $$I_1/I_2=B_2/B_1$$

The last equation states that at a position of equilibrium the ratio of the currents in the two coils is equal to the ratio of the flux densities at the equilibrium points in the two gaps.

While the conventional ratiometer has many uses in its present form, there are two characteristics which seriously limit its usefulness. One disadvantage of the present type of moving coil ratiometer is that since each coil swings in its own separate gap the torque developed is necessarily only half that developed in a conventional moving coil type in which a single coil swings in two gaps. One object of the present invention, therefore, is to increase the torque developed in the two coils by causing both coils to swing in one semicircular gap in which the flux densities are twice as great as those in a magnetic system containing two gaps in series.

Another disadvantage of the conventional two-gap ratiometer is that no matter how the two gaps vary in length from top to bottom, whether alike or unlike, the ratio of the total fluxes $\phi_2/\phi_1$ for the two gaps will always equal 1.000 in a horizontal plane, or when the movement has been deflected 45° from the end of the scale, with the pointer vertical. Another object of the present invention is to make $\phi_2/\phi_1$ unity at the end of the scale when the movement is in the 90° position.

The two advantages disclosed in the present invention can be obtained conventionally only if the ratiometer has two independent magnetic systems side by side with the two coils mounted on the ends of a long shaft. This type of construction is difficult and expensive and it is a further object of this invention to obtain the advantages of a ratiometer employing two independent magnetic systems by means of a single magnetic system in which both coils swing in a single semicircular gap of uniform length between the pole pieces of a magnet. In the present invention, the flux density is constant over the entire gap of about 200° of arc. Since the magnetomotive force across the gap is uniform, a constant flux density is obtained by means of a gap of uniform length. The total flux passing through each of the two coils at any position of the movement will then depend solely on the area of the pole faces adjacent to the coils. In the present invention, therefore, we have where $S_1$ and $S_2$ are area of pole faces at points 1 and 2 in the gap Torque in coil #1=$NI_1S_1$ (deflecting coil)
Torque in coil #2=$NI_2S_2$ (control coil)

and at equilibrium $$I_1/I_2=S_2/S_1$$

or the ratio of the currents in the two coils is equal to the ratio of the areas of the pole faces at those points in the gap occupied by the coils. Or better, the ratio of the two currents in the two coils at any position of the movement is equal to the inverse ratio of the areas of the two coils actually in the gap in that position.

The invention is easily understood by referring to the attached figures.

FIG. 1 is a schematic view of the front. In the figure, 1 is a powerful permanent magnet, 2 and 3 are the soft iron pole pieces. 4 is an angular section of the semicircular gap of about 100° in which the flux density and the area of the pole faces are uniform, while 5 is an angular section of about 90° in which the flux density is the same as in gap 4 but the total flux at any point increases from the bottom to the top of the gap. 6 is the coil which swings in the uniform portion 4 of the gap, called the deflecting coil, and 7 are the torqueless leads to coil 6. 8 is the control coil and 9 are its torqueless current leads. Both 6 and 8 are suitably attached at right angles to one another to the pivot post 10. Attached to 10 are also the pointer 11 and the balancing weights 12. 13 is a scale calibrated from 0–90° or in any desired manner.

Figure 1:
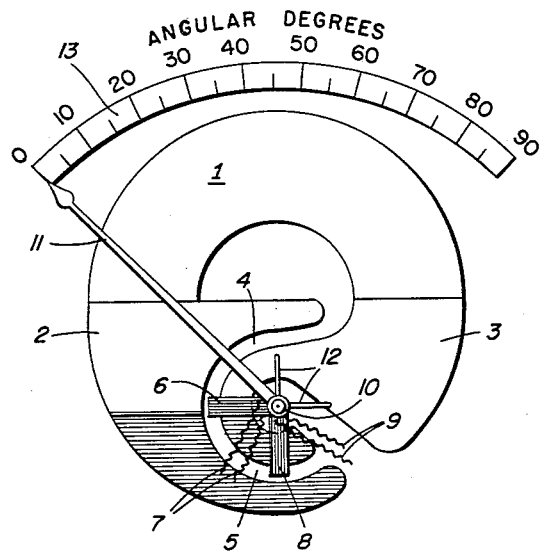

The action of the ratiometer can be understood by noting that pole piece 2 is cut away at one side. This shows that the pole piece increases in width from bottom to top, thereby increasing the number of lines of flux through which coil 8 must pass at it rotates in a clockwise direction (FIG. 1), so that if the current in 8 is constant the torque developed will increase linearly as the coil rotates.

On the other hand, the torque developed in coil 8 is opposed by that developed by coil 6 which moves in a uniform field. This means that the current in coil 6 has to increase in order to cause the movement to rotate in a clockwise direction. The following condition exists: coil 6 (deflecting coil) carries an increasing current through a constant flux, while coil 8 (control coil) carries a constant current through an increasing flux. At equilibrium the two are equal and $$I_1\phi_1=I_2\phi_2$$

Figure 2:
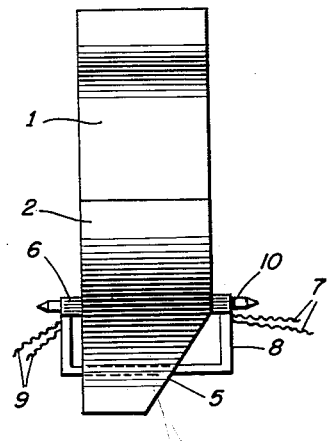
FIG. 2 is a side view of the magnetic system and moving coils shown in FIG. 1. 1 is the permanent magnet, 2 the left-hand pole piece, 5 the variable portion of the gap in which swings control coil 8. 6 is the deflecting coil. The torqueless leads are not shown.

It can be seen from FIG. 2 that the number of lines of flux through which coil 8 rotates increases linearly in a clockwise direction. This is due to the increasing width of the pole pieces from the bottom up. In this type of control the coil acts like a spring in a conventional type moving coil instrument.

Figure 3:
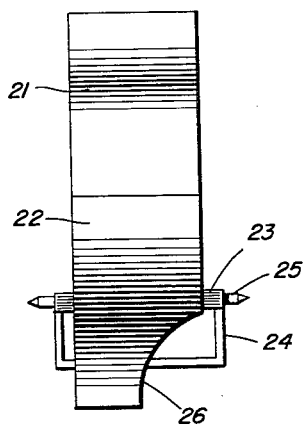
FIG. 3 is a side view of the magnetic system when the control coil moves through a magnetic field in which the total flux increases exponentially or according to some power greater than unity.

While a linear control is in most cases desirable there are occasions in which the deflecting coil increases in a non-linear manner. If, for example, the current through deflecting coil 23 in FIG. 3 increases exponentially or according to some power greater than unity, the torque developed by coil 23 will increase according to $$e^{KI}1 \text{ or } I_1^n \text{ where } n>1.00$$

whereas it may be desirable to have a linear scale on the dial of the indicator. In that case, it will be necessary to shape the portion 26 of the pole pieces through which the control coil moves so that the flux increases exponentially or in any desired manner.

Figure 4:
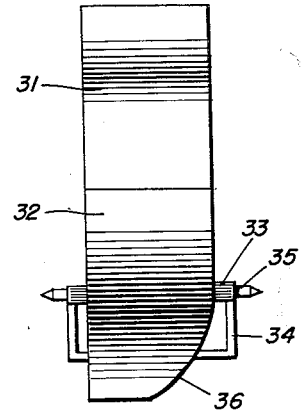
FIG. 4 is a side view of the magnetic system when the control coil moves through a magnetic field which increases logarithmically or according to some power less than 1.00.

If the current through deflecting coil 33 in FIG. 4 increases logarithmically or according to some power less than unity, it will be necessary to shape the portion 36 of the pole pieces through which control coil 34 moves so that the flux increases logarithmically or according to some power necessary to permit the use of a linear scale on the dial of the indicator.

It is also possible to keep the width of the pole pieces uniform over that portion of the gap through which the control coil moves. The flux through this portion of the gap can be made to increase in a clockwise direction by decreasing the length of the gap uniformly, thereby increasing the flux density from bottom to top of the gap. This design is not so advantageous as that shown in the figures.

While this invention has been illustrated above in limited embodiments, it is understood that modifications and variations may be made without departing from the spirit and scope of the invention as defined by the appended claims.

What is claimed is:
1. An electrical ratiometer comprising a substantially planar magnetic circuit consisting of a U-shaped permanent magnet having soft-iron polepieces thereon, said polepieces having spaced concave and convex polefaces to form a single arcuate-shaped approximately 200 degree airgap of constant length, approximately one half of said airgap having a constant cross-section area and the remaining approximately one half of the airgap having a nonuniform cross-section area due to reduction in depth of the polefaces, and a pivot-post mounted to rotate at right angles to the magnetic field in said airgap, said pivot-post carrying a deflecting coil and a control coil mounted at right angles to each other and each of said coils having an active side in the single airgap, whereby upon movement of the coils the active side of one coil travels in the constant cross-section area part of the airgap and the active side of the other coil travels in the nonuniform cross-section area part of the airgap.

2. An electrical ratiometer as in claim 1 wherein the nonuniform cross-section area of the remaining approximately one half of the airgap is due to a linear variation in depth of the polefaces.

3. An electrical ratiometer as in claim 1 wherein the nonuniform cross-section area of the remaining approximately one half of the airgap is due to an exponential or a logarithmic variation in depth of the polefaces.

References Cited in the file of this patent

UNITED STATES PATENTS

| 1,171,907 | Trent | Feb. 15, 1916 |
| 1,782,588 | Terman | Nov. 25, 1930 |

FOREIGN PATENTS

| 165,150 | Great Britain | June 30, 1921 |